United States Patent
Steinbrenner et al.

(10) Patent No.: US 7,985,718 B2
(45) Date of Patent: Jul. 26, 2011

(54) USE OF SURFACTANT MIXTURES FOR TERTIARY MINERAL OIL EXTRACTION

(75) Inventors: Ulrich Steinbrenner, Neustadt (DE); Christian Bittner, Bensheim (DE); Oetter Günter, Frankenthal (DE); Marcus Guzmann, Mühlhausen (DE)

(73) Assignee: BASF SE, Ludwigshafen (DE)

( * ) Notice: Subject to any disclaimer, the term of this patent is extended or adjusted under 35 U.S.C. 154(b) by 80 days.

(21) Appl. No.: 12/427,109

(22) Filed: Apr. 21, 2009

(65) Prior Publication Data

US 2009/0270281 A1 Oct. 29, 2009

Related U.S. Application Data

(60) Provisional application No. 61/046,585, filed on Apr. 21, 2008.

(51) Int. Cl.
*C09K 8/64* (2006.01)
*C09K 8/528* (2006.01)
*C09K 8/584* (2006.01)
*C09K 8/78* (2006.01)
*C09K 8/60* (2006.01)
*C02F 5/10* (2006.01)
*E21B 43/00* (2006.01)
*E21B 43/16* (2006.01)
*E21B 43/22* (2006.01)

(52) U.S. Cl. ........ 507/265; 507/235; 507/237; 507/252; 507/253; 507/255; 507/256; 507/259; 507/261; 507/267; 507/269; 166/268; 166/270.1

(58) Field of Classification Search .............. 507/237, 507/262, 255, 238, 235, 252, 253, 256, 259, 507/261, 265, 267, 269, 276; 166/268, 270.1
See application file for complete search history.

(56) References Cited

U.S. PATENT DOCUMENTS

| 3,811,504 A | 5/1974 | Flournoy et al. |
| 3,811,505 A | 5/1974 | Flournoy et al. |
| 3,811,507 A | 5/1974 | Flournoy et al. |
| 3,890,239 A | 6/1975 | Dycus et al. |
| 4,463,806 A | 8/1984 | Hurd |
| 4,468,335 A | 8/1984 | Chen et al. |
| 4,468,342 A | 8/1984 | Chen |
| 2004/0177958 A1 | 9/2004 | Shpakoff et al. |
| 2006/0185845 A1 | 8/2006 | Shpakoff et al. |
| 2008/0194435 A1* | 8/2008 | Huff et al. ............ 507/224 |
| 2009/0325824 A1* | 12/2009 | Steinbrenner ............ 507/131 |

FOREIGN PATENT DOCUMENTS

| DE | 4325237 A1 | 2/1995 |
| DE | 4339713 A1 | 5/1995 |
| DE | 10243361 A1 | 4/2004 |
| EP | 311 961 A | 4/1989 |
| WO | WO 2006/131541 A1 | 12/2006 |
| WO | WO 2008/012242 A1 * | 1/2008 |
| WO | WO-2009050179 | 4/2009 |

OTHER PUBLICATIONS

Taylor et al., "Water-soluble hydrophobically associating polymers for improved oil recovery: A literature review", Journal of Petroleum Science and Engineering, vol. 19, (1998) pp. 265-280.
Melrose et al., "Role of Capillary Forces in Determining Microscopic Displacement Efficiency for Oil Recovery by Waterflooding", The Journal of Canadian Petroleum, (1974), pp. 54-62.
Levitt et al., "Identification and Evaluation of High-Performance EOR Surfactants", SPE International, SPE 10089, pp. 1-11, presented at the SPE/DOE Symposium held in Tulsa, Oklahoma, USA, Apr. 22-26, 2006.

* cited by examiner

*Primary Examiner* — Timothy J. Kugel
*Assistant Examiner* — Atnaf Admasu
(74) *Attorney, Agent, or Firm* — Connolly Bove Lodge & Hutz LLP (57) ABSTRACT

The use of a surfactant mixture comprising at least one surfactant having a hydrocarbon radical composed of from 12 to 30 carbon atoms and at least one cosurfactant having a branched hydrocarbon radical composed of from 6 to 11 carbon atoms for tertiary mineral oil extraction.

19 Claims, 2 Drawing Sheets

USE OF SURFACTANT MIXTURES FOR TERTIARY MINERAL OIL EXTRACTION

CROSS REFERENCE TO RELATED APPLICATIONS

This application claims the benefit of U.S. Provisional Application No. 61/046,585, filed Apr. 21, 2008, the entire contents of which are incorporated herein by reference.

The invention relates to the use of a surfactant mixture comprising at least one surfactant having a hydrocarbon radical composed of from 12 to 30 carbon atoms and at least one cosurfactant having a branched hydrocarbon radical composed of from 6 to 11 carbon atoms for tertiary mineral oil extraction.

In natural mineral oil deposits, mineral oil is present in the cavities of porous reservoir rocks which are sealed toward the surface of the earth by impermeable top layers. The cavities may be very fine cavities, capillaries, pores or the like. Fine pore necks may, for example, have a diameter of only approx. 1 μm. As well as mineral oil, including fractions of natural gas, a deposit comprises water with a greater or lesser salt content. The salt content of deposit water is not rarely from 5 to 20% by weight; but there are also deposits with a salt content of up to 27% by weight. The dissolved salts may, for example, be alkali metal salts; in some deposits, the deposit water, however, also comprises more than relatively high contents of alkaline earth metal ions, for example up to 5% by weight of calcium ions and/or magnesium ions.

In mineral oil extraction, a distinction is drawn between primary, secondary and tertiary extraction.

In primary extraction, the mineral oil flows, after commencement of drilling of the deposit, of its own accord through the borehole to the surface owing to the autogenous pressure of the deposit. The autogenous pressure can be caused by gases present in the deposit, such as methane, ethane or propane. By means of the primary extraction, according to the deposit type, it is, though, usually possible to extract only approx. 5 to 10% of the amount of mineral oil present in the deposit; thereafter, the autogenous pressure is no longer sufficient for extraction.

Figure 1:
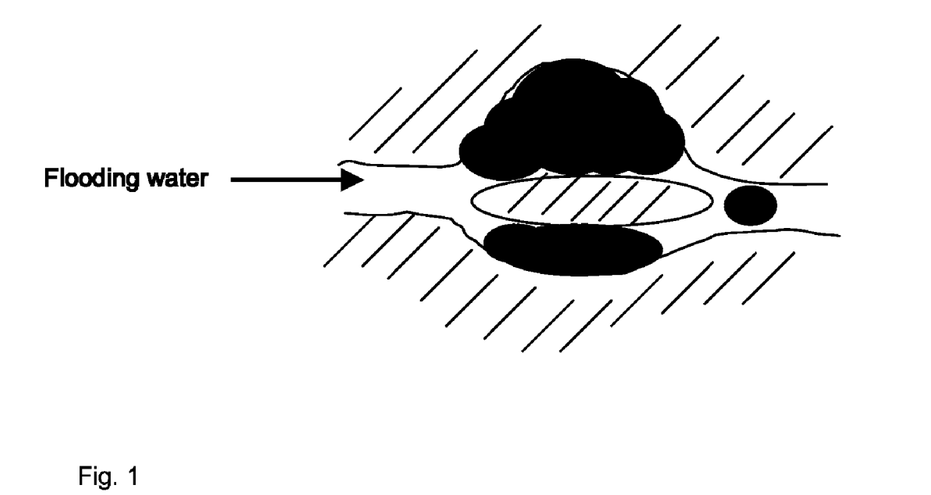
FIG. 1 situation at the start of secondary oil extraction: completely oil-filled rock pore.
Figure 2:
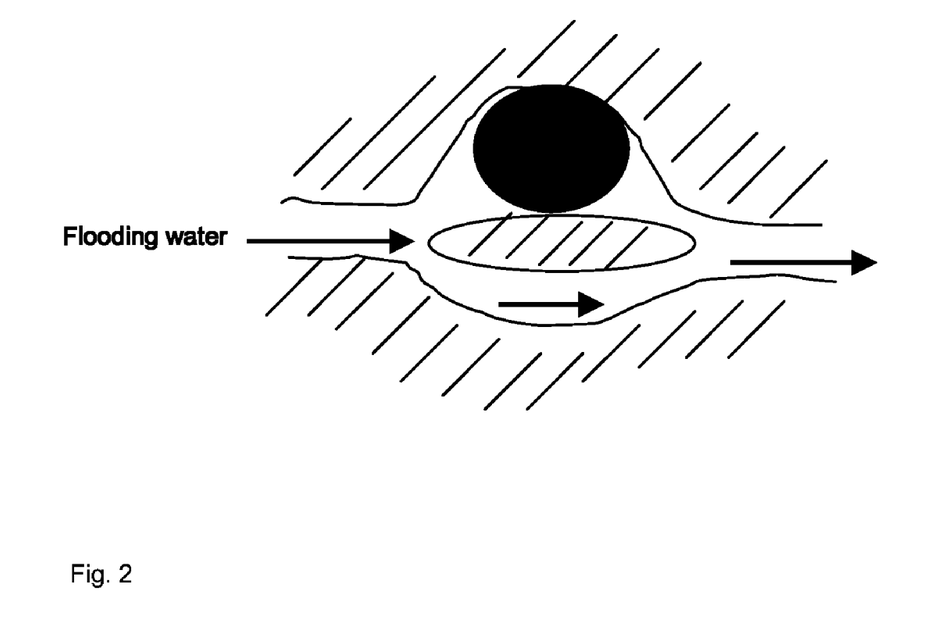
FIG. 2 situation toward the end of secondary oil extraction: the flooding water has formed a channel and flows through the channel without picking up further oil.

After primary extraction, secondary extraction is therefore used. In secondary extraction, in addition to the boreholes which serve for the extraction of the mineral oil, the so-called production bores, further boreholes are drilled into the mineral oil-bearing formation. Water is injected into the deposit through these so-called injection bores in order to maintain the pressure or to increase it again. As a result of the injection of the water, the mineral oil is forced through the cavities in the formation slowly, proceeding from the injection bore, in the direction of the production bore. However, this only works for as long as the cavities are completely filled with oil and the more viscous oil is pushed onward by the water (see FIG. 1). As soon as the mobile water breaks through cavities, it flows on the path of least resistance from this time, i.e. through the channel formed, and no longer pushes the oil onward. This situation is shown in FIG. 2: owing to the different polarity of oil and water, a high interfacial energy or interfacial tension arises between the two components. The two therefore adopt the smallest contact area with respect to one another, which results in a spherical oil droplet which no longer fits through the fine capillaries. At the end of the water flow, the oil is thus trapped in the capillaries in discontinuous form (isolated spherical droplets).

By means of primary and secondary extraction, generally only approx. 30 to 35% of the amount of mineral oil present in the deposit can be extracted.

It is known that the mineral oil yield can be enhanced further by measures for tertiary oil extraction. A review of tertiary oil extraction can be found, for example, in the Journal of Petroleum Science and Engineering 19 (1998) 265-280. Tertiary oil extraction includes thermal methods in which hot water or steam is injected into the deposit. This lowers the viscosity of the oil. The flow medium used may also be gases such as $CO_2$ or nitrogen.

Tertiary mineral oil extraction also includes methods in which suitable chemicals are used as assistants for oil extraction. These can be used to influence the situation toward the end of the water flow and as a result also to extract mineral oil hitherto held firmly within the rock formation.

Viscous and capillary forces act on the mineral oil which is trapped in the pores of the deposit rock toward the end of the secondary extraction, the ratio of these two forces relative to one another being determined by the microscopic oil separation. By means of a dimensionless parameter, the so-called capillary number, the action of these forces is described. It is the ratio of the viscosity forces (velocity×viscosity of the forcing phase) to the capillary forces (interfacial tension between oil and water×wetting of the rock):

$$N_c = \frac{\mu v}{\sigma \cos\theta}.$$

In this formula, μ is the viscosity of the fluid mobilizing mineral oil, ν is the Darcy velocity (flow per unit area), σ is the interfacial tension between liquid mobilizing mineral oil and mineral oil, and θ is the contact angle between mineral oil and the rock (C. Melrose, C. F. Brandner, J. Canadian Petr. Techn. 58, October-December, 1974). The higher the capillary number, the greater the mobilization of the oil and hence also the degree of oil removal.

It is known that the capillarity number toward the end of secondary mineral oil extraction is in the region of about $10^{-6}$ and that it is necessary to increase the capillarity number to from about $10^{-3}$ to $10^{-2}$ in order to be able to mobilize additional mineral oil.

To this end, for example, the interfacial tension σ between mineral oil and aqueous phase can be lowered by the addition of suitable surfactants. This technique is also known as "surfactant flooding". Suitable surfactants for surfactant flooding are especially surfactants which can lower σ to values of $<10^{-2}$ mN/m (ultralow interfacial tension). In this manner, it is possible to change the shape of the oil droplets and to force them through the capillary orifices by means of the flooding water.

Figure 3:
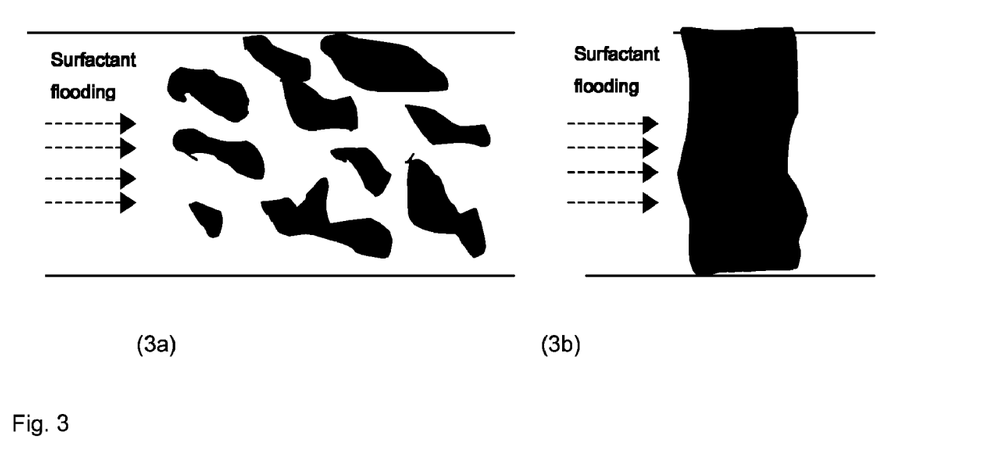
FIG. 3 schematic illustration of surfactant flooding in a mineral oil formation: oil droplets released from the rock pores before (3a) and after (3b) combination to a continuous oil bank.
Figure 4:
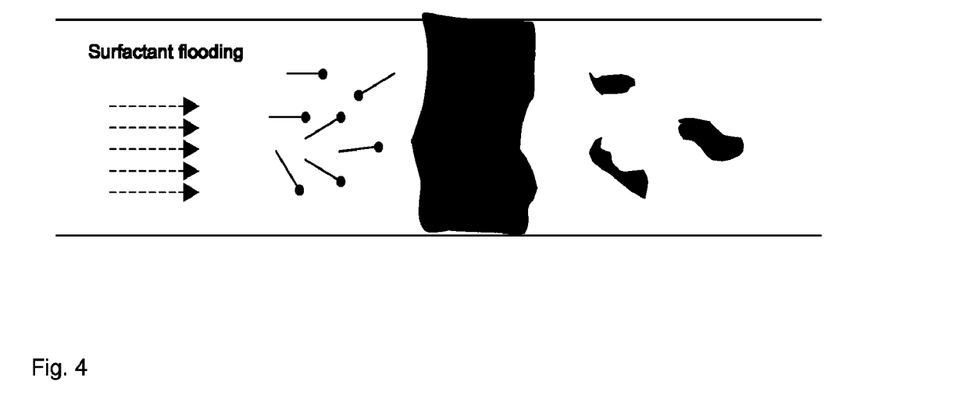
FIG. 4 schematic illustration of the progress of the continuous oil bank in the mineral oil formation. The oil bank absorbs new oil droplets in flow direction. Surfactant is released counter to the flow direction.

It is desired that the oil droplets subsequently combine to a continuous oil bank. This is shown schematically in FIG. 3. This has two kinds of advantages: firstly, as the continuous oil bank advances through new porous rock, the oil droplets present there can merge with the bank. Moreover, the combination of the oil droplets to form an oil bank significantly reduces the oil-water interface, and surfactant which is no longer required is thus released. The released surfactant can then mobilize oil droplets remaining in the formation. This is shown schematically in FIG. 4. An ultralow interfacial tension between the water phase and the oil phase is also required to combine the oil droplets to an oil bank and to incorporate new oil droplets into the oil bank. Otherwise, individual oil droplets remain or are not incorporated into the oil bank. This reduces the efficiency of the surfactant flooding.

In general, after the surfactant flooding, to maintain the pressure, water is not injected into the formation, but rather a higher-viscosity aqueous solution of a polymer with high thickening action. This technique is known as "polymer flooding".

In surfactant flooding, the surfactants should form a microemulsion (Winsor type III) with the water phase and the oil phase. A microemulsion (Winsor type III) is not an emulsion with particularly small droplets, but rather a thermodynamically stable, liquid mixture of water, oil and surfactants which has a very low interfacial tension and usually possesses a low viscosity. It is in equilibrium with excess water and excess oil. A low viscosity is desirable to transport the emulsion in the mineral oil formation. At an excessively high viscosity of the phase to be transported, a very high pressure would have to be applied in the course of polymer flooding. This is firstly expensive, but there is in particular also the risk that the pressure might undesirably blast new cavities in the mineral oil formation. In addition, a combination of the mobilized oil droplets to a continuous oil bank is hindered in the case of excessively high viscosities.

An important technical requirement on surfactant flooding is that the phases are separated and the microemulsion is formed (Winsor type III) as rapidly as possible. Since the surfactant flood remains within the mineral oil formation for a relatively long period, this requirement appears to be superfluous at first glance. However, this is not the case. This is because the surfactant flood is constantly exposed to strong shear forces in the course of its passage through the mineral oil formation, for example as it passes through narrow capillaries. These shear forces can again bring about mixing of the three phases or at least greatly delay the phase separation. It is therefore important to use a surfactant flood which can counteract the mixing tendencies and with which the microemulsion (Winsor type III) can always form rapidly again.

It has been found that, empirically, the better the surfactants used lower the interfacial tension, the longer the separating times often are. There is therefore still a need to find surfactant systems which, on the one hand, can bring about a very significant lowering of the interfacial tension and which, on the other hand, also have a minimum separation time.

Surfactant mixtures for tertiary mineral oil extraction are known in principle.

U.S. Pat. No. 3,811,504 discloses a mixture of 2 different anionic surfactants and a nonionic surfactant for use in deposits whose deposit water comprises from 0.15 to 1.2% calcium and magnesium ions. The first anionic surfactant comprises alkyl sulfonates having from 5 to 25 carbon atoms or alkylaryl sulfonates whose alkyl radical has from 5 to 25 carbon atoms, the second comprises alkyl polyethoxy sulfates whose alkyl radical has from 7 to 20 carbon atoms, and the nonionic surfactant comprises ethoxylated alkylphenols whose alkyl radical has from 6 to 20 carbon atoms, or aliphatic alcohols having from 5 to 20 carbon atoms.

U.S. Pat. No. 3,811,505 discloses a mixture of an anionic surfactant and a nonionic surfactant for use in deposits whose deposit water comprises from 0.5 to 0.9% by weight of polyvalent ions. The anionic surfactants are alkyl sulfonates or alkyl phosphates having in each case from 5 to 25 carbon atoms, alkylaryl sulfonates or alkylaryl phosphonates whose alkyl radical has in each case from 5 to 25 carbon atoms. The nonionic surfactants are polyethoxylated alkylphenols which have from 6 to 20 ethoxy groups and whose alkyl radical has from 5 to 20 carbon atoms, or polyethoxylated aliphatic alcohols having from 6 to 20 carbon atoms and from 6 to 20 ethoxy groups.

U.S. Pat. No. 3,811,507 discloses a mixture of two different anionic surfactants for use in deposits whose deposit water comprises from 0.3 to 1.8% by weight of calcium and magnesium ions. The first anionic surfactant comprises alkyl sulfonates having from 5 to 25 carbon atoms or alkylaryl sulfonates whose alkyl radical comprises in each case from 5 to 25 carbon atoms. The second anionic surfactant comprises alkyl polyethoxy sulfates which have from 1 to 10 ethoxy groups and whose alkyl radical has from 7 to 20 carbon atoms.

U.S. Pat. No. 3,890,239 discloses a surfactant mixture for mineral oil extraction which comprises an organic sulfonate, preferably having from 12 to 30 carbon atoms, a polyalkylene glycol alkyl ether and a sulfonated or sulfated, oxyalkylated alcohol. The latter may, for example, comprise aliphatic alcohols having from 8 to 20 carbon atoms or alkylphenols having an alkyl radical with from 5 to 20 carbon atoms.

U.S. Pat. No. 4,463,806 discloses a mixture for surfactant flooding which comprises, as surfactants, a petroleum sulfonate and an alkyl ether sulfonate having from 8 to 22 carbon atoms or an alkylaryl ether sulfonate having an alkyl radical having from 5 to 24 carbon atoms.

US 2006/0185845 A1 discloses the use of a mixture of at least one aliphatic anionic surfactant and a branched aliphatic nonionic surfactant for mineral oil extraction. The branched aliphatic radical has preferably from 10 to 24 carbon atoms and the degree of branching is from 0.7 to 2.5.

US 2006/018486 discloses the use of a mixture of at least one branched aliphatic anionic surfactant and an aliphatic nonionic surfactant for mineral oil extraction. The branched aliphatic radical has preferably from 10 to 24 carbon atoms and the degree of branching is from 0.7 to 2.5.

None of the documents cited discusses the problems of the rate of separation.

D. B. Levitt, A. C. Jackson, L. Britton and G. A. Pope, "Identification and Evaluation of High-Performance EOR Surfactants," SPE 100089, conference contribution for the SPE Symposium on Improved Oil Recovery Annual Meeting, Tulsa, Okla., Apr. 24-26, 2006, describe the use of sulfonates based on hydrophobic moieties of $C_{13}$ to $C_{24}$, and also the use of short branched alcohols, for example sec-butanol and isopropanol, as cosolvents to accelerate the phase separation. The use of $C_6$- to $C_{11}$-alcohol alkoxylates as cosurfactants is not disclosed.

It was an object of the invention to find a surfactant system for tertiary mineral oil extraction which, on the one hand, brings about a very significant lowering in the interfacial tension and which, on the other hand, also has a very short separation time.

Accordingly, the use of a surfactant mixture for tertiary mineral oil extraction has been found, in which an aqueous surfactant formulation is injected through at least one injection bore into a mineral oil deposit and crude oil is removed from the deposit through at least one production bore, said surfactant mixture comprising at least the following surfactants:

(A) from 1 to 99% by weight of at least one surfactant (A) of the general formula $R^1$—X where $R^1$ is a hydrocarbon radical having from 12 to 30 carbon atoms and X is a hydrophilic group, and (B) from 1 to 90% by weight of at least one cosurfactant (B), where the amounts stated are based in each case on the total amount of all surfactants in the mixture, wherein the cosurfactant (B) has the general formula $R^2$—O—($R^3$—O)$_n$—$R^4$ (I) and where the $R^2$, $R^3$ and $R^4$ radicals and the number n are each defined as follows:

n is from 2 to 20, $R^2$ is a branched hydrocarbon radical which has from 6 to 11 carbon atoms and an average degree of branching of from 1 to 2.5, selected from the group of $R^{2a}$ saturated, aliphatic hydrocarbon radicals, or $R^{2b}$ phenyl or $R^6$-phenyl, where $R^6$ is an alkyl radical having from 1 to 5 carbon atoms, $R^{2b}$ phenyl-substituted hydrocarbon radicals of the general formula phenyl-$R^7$ where $R^7$ is a divalent hydrocarbon radical having from 1 to 5 carbon atoms, $R^3$ are each independently an ethylene group or a propylene group, with the proviso that the ethylene and propylene groups—where both types of groups are present—may be arranged randomly, alternately or in block structure, $R^4$ is hydrogen or a group selected from the group of —$SO_3H$, —$PO_3H_2$, —$R^5$—COON, —$R^5$—$SO_3H$ or —$R^5$—$PO_3H_2$ or salts thereof, where $R^5$ is a divalent hydrocarbon group having from 1 to 4 carbon atoms, with the proviso that the amount of surfactants (A) and cosurfactants (B) together is at least 25% by weight based on the amount of all surfactants in the mixture.

A preferred embodiment of the invention concerns a mixture which comprises from 50 to 99% by weight of surfactant (A) and from 1 to 50% by weight of cosurfactant (B).

It has been found that, surprisingly, a particularly rapid phase separation is achieved using this surfactant mixture.

Regarding the invention, the following should be stated specifically:

The mixture used in accordance with the invention comprises from 1 to 99% by weight of at least one surfactant (A) and from 1 to 90% by weight of at least one cosurfactant (B). It will be appreciated that it is also possible for a plurality of different surfactants (A) and/or a plurality of different surfactants (B) to be used. Optionally, it is additionally also possible for further cosurfactants (C) other than the surfactants (A) and the cosurfactants (B) to be used.

Surfactants (A)

The surfactants (A) have the general formula $R^1$—X. $R^1$ here is a saturated, unsaturated and/or aromatic, linear or branched hydrocarbon radical having from 12 to 30, preferably from 14 to 22, more preferably from 16 to 20 and most preferably from 16 to 18 carbon atoms. It is preferably a branched hydrocarbon radical.

X is a hydrophilic group which imparts amphiphilic properties to the molecule. It may in principle be any hydrophilic groups which are suitable for use as end groups in surfactants. The person skilled in the art is aware of appropriate hydrophilic groups. Suitable hydrophilic X groups comprise anionic, nonionic, cationic or betainic groups. They are preferably anionic or nonionic groups. Examples of preferred X groups comprise sulfonate groups, sulfate groups, polyoxyalkylene groups, anionically modified polyoxyalkylene groups, glucoside groups or amine oxide groups.

Particular preference is given to surfactants which have sulfonic acid groups, and also surfactants with polyoxyalkylene groups or anionically modified polyoxyalkylene groups. Anionically modified polyoxyalkylene groups preferably have terminal sulfonate, terminal carboxylate or terminal sulfate groups, more preferably terminal sulfonate groups. Acidic groups may of course also be used in the form of their salts. The polyoxyalkylene groups may comprise from 1 to 50 oxyalkylene groups, preferably from 1 to 40, preferably ethoxy groups and/or propoxy groups. In addition, even higher alkyleneoxy groups may also be present. Preferably at least 50% of the oxyalkylene groups present are ethoxy groups.

In a particularly preferred embodiment of the invention, the surfactants (A) are organic sulfonates, for example alkylbenzenesulfonates, olefinsulfonates or paraffinsulfonates. Very particular preference is given to olefinsulfonates. Olefinsulfonates comprise an ethylenically unsaturated group and a sulfonic acid group and can be prepared by reacting suitable olefins with $SO_3$. Industrially prepared olefinsulfonates, as a result of the preparation, frequently additionally comprise hydroxyalkylsulfonates. In particular, it is possible to use olefinsulfonates whose hydrocarbon radical comprises from 14 to 28 carbon atoms. They are preferably branched hydrocarbon radicals. For example, it is possible to use iso-$C_{16}$-olefinsulfonates.

The person skilled in the art is aware of suitable surfactants $R^1$—X for tertiary mineral oil extraction and preparation methods for such surfactants. Surfactants of this kind are also commercially available.

Cosurfactants (B)

According to the invention, the surfactants (A) are used in a mixture with at least one cosurfactant (B) which has the general formula $R^2$—O—($R^3$—O)$_n$—$R^4$ (I).

In formula (I), $R^2$ is a branched aliphatic and/or aromatic hydrocarbon radical which has from 6 to 11 carbon atoms and an average degree of branching of from 1 to 2.5, preferably from 1 to 1.5.

In this context, the term "degree of branching" is understood to mean the mean number of carbon atoms in the $R^2$ radical which are bonded to three further atoms apart from hydrogen plus twice the number of carbon atoms which are bonded to four further atoms apart from hydrogen. The carbon atom bonded to the —O—($R^3$—O)$_n$—$R^4$— group is also counted here. The terms "average degree of branching" and "mean number of carbon atoms" are based on the fact that the cosurfactants (B) used in accordance with the invention can be synthesized not only by using isomerically pure alcohols but also typical technical alcohol mixtures which may comprise a certain distribution of different alcohols and especially different isomers.

According to the definition, for example, an n-alkyl radical bonded in the 1 position to the —O—($R^3$—O)$_n$—$R^4$— group has a degree of branching of 0 and does not belong within the scope of this invention, while an n-alkyl radical which is joined via one of the nonterminal carbon atoms has a degree of branching of 1. A phenyl group has a degree of branching of 1 and a monoalkyl-substituted phenyl group a degree of branching of 2.

The $R^2$ radicals are selected from the group of $R^{2a}$, $R^{2b}$ and $R^{2b}$, preferably $R^{2a}$ and $R^{2b}$ and more preferably $R^{2a}$.

$R^{2a}$ comprises branched, saturated, aliphatic hydrocarbon radicals having from 6 to 11 carbon atoms. What is meant by this is in each case the mean number of carbon atoms. They are preferably radicals which have an average of from 8 to 10 and more preferably from 9.5 to 10.5 carbon atoms. The degree of branching of the $R^{2a}$ radicals is preferably from 1 to 1.5.

Examples of suitable radicals for $R^{2a}$ comprise 2-methyl-1-pentyl, 2-ethyl-1-hexyl, 2-propyl-1-heptyl, 5-methyl-2-propyl-1-hexyl, 4-methyl-2-propyl-1-hexyl, 3-methyl-2-propyl-1-hexyl, 2-ethyl-4-methyl-1-pentyl and 2-ethyl-3-methyl-1-pentyl radicals.

Further examples of preferred $R^{2a}$ radicals comprise especially radicals which derive from technical alcohols, especially oxo alcohols and Guerbet alcohols, more preferably C10 oxo alcohols and C10 Guerbet alcohols.

The terms "oxo alcohol" and "Guerbet alcohol" are known to those skilled in the art. Reference is made by way of example to "Alcohols, Aliphatic", page 5 and page 10 respectively in Ullmann's Encyclopedia of Industrial Chemistry, Seventh Edt., Electronic Release, 2008, Wiley-VCH, Weinheim, N.Y., and the literature cited there. In the course of the Guerbet reaction, primary alcohols are ultimately dimerized to α-branched primary alcohols in the presence of suitable catalysts. According to the literature, the primary products formed from the alcohols are aldehydes which subsequently dimerize to saturated alcohols by aldol condensation with elimination of water and subsequent hydrogenation. As well as the main product, different by-products can also form, for example unsaturated α-branched primary alcohols if the hydrogenation of the double bond does not proceed to completion, or more particularly α-branched primary alcohols which have additional branches in the side chain or main chain.

A preferred $R^{2a}$ radical is a radical derived from a Guerbet alcohol, i.e. a technical mixture of different radicals in which at least 65 mol%, preferably at least 80 mol%, of the radicals have the general formula (II)

where p may be 0, 1 or 2. p is preferably 2.

$R^{2b}$ is a phenyl radical or monoalkyl-substituted phenyl radicals $R^6$-phenyl where $R^6$ is an alkyl radical having from 1 to 5 carbon atoms. More particularly, it is a linear alkyl radical, preference being given to methyl or ethyl radicals and particular preference to methyl.

Examples of $R^{2b}$ radicals comprise phenyl, 2-methyl-1-phenyl, 3-methyl-1-phenyl, 4-methyl-1-phenyl, 2-ethyl-1-phenyl, 3-ethyl-1-phenyl or 4-ethyl-1-phenyl, preference being given to phenyl, 2-methyl-1-phenyl, 3-methyl-1-phenyl, 4-methyl-1-phenyl, and particular preference to phenyl.

$R^{2c}$ comprises phenyl-substituted hydrocarbon radicals of the general formula phenyl-$R^7$— where $R^7$ is a divalent hydrocarbon radical having from 1 to 5 carbon atoms, preferably 1 or 2 carbon atoms. Examples of preferred $R^{2c}$ radicals are benzyl radicals, and also phenyl-$CH_2$—$CH_2$— and phenyl-$CH(CH_3)$—.

The cosurfactants (B) further comprise n-($R^3$—O)— groups. The n $R^3$ radicals are each independently ethylene groups or propylene groups. The ethylene groups and propylene groups may—where both types of groups are present—be arranged randomly, alternately or in block structure. The structure is preferably a block structure in which the propoxy and ethoxy groups are actually arranged in the $R^{20}$-propoxy block-ethoxy block sequence.

The number n here is from 2 to 20, preferably from 6 to 15 and more preferably from 6 to 10. As is known to those skilled in the art, degrees of alkoxylation are averages. The number n is accordingly not a natural number but rather a rational number.

In general, not more than 50% of the n $R^3$ radicals should be propylene groups. Preferably from 0 to 2 of the n $R^3$ radicals are propylene groups, and more preferably exclusively ethylene groups are present.

$R^4$ may be hydrogen. In this case, the cosurfactant (B) is a nonionic surfactant of the general formula $R^2$—O—($R^3$—O)$_n$—H.

In addition, the group may be one selected from the group of —$SO_3H$, —$PO_3H_2$, —$R^5$—COON, —$R^5$—$SO_3H$ or —$R^5$—$PO_3H_2$ or salts thereof. The $R^5$ group is a divalent hydrocarbon group which has from 1 to 4 carbon atoms and may optionally have functional groups, especially —OH, as substituents. It is preferably a group selected from the group of methylene groups —$CH_2$—, 1,2-ethylene groups —$CH_2$—$CH_2$—, 1,2-propylene groups —$CH_2$—CH($CH_3$)— and —CH($CH_3$)—$CH_2$— or 1,3-propylene groups —$CH_2$—CH($R^8$)—$CH_2$—, where $R^8$ may be H or OH.

Suitable counterions for salts of the cosurfactants comprise especially $NH_4^+$, ammonium ions with organic radicals or alkali metal ions, especially $Li^+$, $Na^+$ and $K^+$, and more preferably $Na^+$.

These end groups result in cosurfactants (B) from the group of the polyethersulfates $R^2$—O—($R^3$—O)$_n$—$SO_3H$, polyether sulfonates $R^2$—O—($R^3$—O)$_n$—$R^8$—$SO_3H$, polyetherphosphates $R^2$—O—($R^3$—O)$_n$—$PO_3H_2$, polyetherphosphonates $R^2$—O—($R^3$—O)$_n$—$R^8$—$PO_3H_2$ or polyethercarboxylates $R^2$—O—($R^3$—O)$_n$—$R^8$—COON. Preference is given to nonionic cosurfactants $R^2$—O—($R^3$—O)$_n$—H, polyether sulfonates $R^2$—O—($R^3$—O)$_n$—$R^8$—$SO_3H$ and polyetherphosphates $R^2$—O—($R^3$—O)$_n$—$PO_3H_2$. In the case of polyetherphosphates, they are preferably compounds of the formula $R^{2b}$—O—($R^3$—O)$_n$—$PO_3H_2$.

The cosurfactants (B) used in accordance with the invention can be prepared in a manner known in principle by alkoxylating an alcohol $R^2$—OH to give a nonionic surfactant $R^2$—O—($R^3$—O)$_n$—H, i.e. a product where $R^4$=H is obtained. Cosurfactants with other $R^4$ groups can be synthesized by converting the resulting nonionic surfactants $R^2$—O—($R^3$—O)$_n$—H in further reaction stages to the corresponding anionically modified polyethers.

The performance of alkoxylations is known in principle to those skilled in the art. It is likewise known to those skilled in the art that the reaction conditions, especially the selection of the catalyst, can influence the molecular weight distribution of the alkoxylates.

The cosurfactants $R^2$—O—($R^3$—O)$_n$—H can be prepared, for example, by base-catalyzed alkoxylation of alcohols $R^2$—OH. To this end, the alcohol $R^2$—OH or the technical alcohol mixture $R^2$—OH can be admixed in a pressure reactor with alkali metal hydroxides, preferably potassium hydroxide, or with alkali metal alkoxides, for example sodium methoxide. By means of reduced pressure (for example <100 mbar) and/or an increase in the temperature (30 to 150° C.), it is also possible to draw off water present in the mixture. The alcohol is then present as the corresponding alkoxide. Subsequently, the mixture is inertized with inert gas (e.g. nitrogen) and the alkylene oxide(s) is/are added stepwise at temperatures of from 60 to 180° C. up to a pressure of max. 10 bar. At the end of the reaction, the catalyst can be neutralized by adding acid (e.g. acetic acid or phosphoric acid) and can be filtered off if required. Cosurfactants prepared by means of KOH catalysis generally have a relatively broad molecular weight distribution.

The cosurfactants $R^2$—O—$(R^3$—O$)_n$—H can also be synthesized by means of techniques which are known to those skilled in the art and lead to narrower molecular weight distributions than in the base-catalyzed synthesis. To this end, the catalysts used may, for example, be double hydroxide clays as described in DE 43 25 237 A1. The alkoxylation can more preferably be effected using double metal cyanide catalysts (DMC catalysts). Suitable DMC catalysts are disclosed, for example, in DE 102 43 361A1, especially paragraphs [0029] to [0041] and literature cited therein. For example, catalysts of the Zn—Co type can be used. To perform the reaction, the alcohol $R^2$—OH can be admixed with the catalyst, and the mixture can be dewatered as described above and reacted with the alkylene oxides as described. Typically not more than 250 ppm of catalyst based on the mixture are used, and the catalyst can remain in the product owing to this small amount.

The cosurfactants $R^2$—O—$(R^3$—O$)_n$—H can additionally also be prepared by acid-catalyzed alkoxylation. The acids may be Brønsted or Lewis acids. To perform the reaction, the alcohol $R^2$—OH can be admixed with the catalyst, and the mixture can be dewatered as described above and reacted with the alkylene oxides as described. At the end of the reaction, the catalyst can be neutralized by adding a base, for example KOH or NaOH, and be filtered off if required.

The selection of the catalyst can also influence the structure of the surfactant. While propylene units used in the case of basic catalysis are incorporated predominantly in the $R^2$—O—(—$CH_2$—$CH(CH_3)$—$)_n$— orientation, the units are incorporated in greater portions in the inverse $R^2$—O—(—$CH(CH_3)$—$CH_2$—$)_n$— orientation in the case of acidic catalysis.

The conversion of $R^2$—O—$(R^3$—O$)_n$—H to the anionically modified surfactants with an $R^4$ group selected from the group of —$SO_3H$, —$PO_3H_2$, —$R^5$—COON, —$R^5$—$SO_3H$ or —$R^5$—$PO_3H_2$ can likewise be undertaken by methods known to those skilled in the art.

Polyether sulfates of the general formula $R^2$—O—$(R^3$—O$)_n$—$SO_3H$ can be synthesized by esterifying $R^2$—O—$(R^3$—O$)_n$—H with sulfuric acid or derivatives thereof, especially $SO_3$.

Polyether sulfonates $R^2$—O—$(R^3$—O$)_n$—$R^5$—$SO_3H$ can be prepared, for example, by substituting the OH group of $R^2$—O—$(R^3$—O$)_n$—H for Cl using phosgene or thionyl chloride. The reaction can be undertaken in the presence of a solvent, for example chlorobenzene. HCl released and $CO_2$ or $SO_2$ released can advantageously be removed from the system by stripping with nitrogen, such that ether cleavage is suppressed. The alkylalkoxychlorine compound is then reacted with an aqueous solution of sodium sulfite, the chloride being substituted for sulfite to obtain the alkyl ether sulfonate. The substitution can be undertaken in the presence of a phase mediator (for example $C_1$ to $C_8$ alcohols) at a temperature of 100-180° C. and under pressure. According to whether an ethoxy group or a propoxy group is present as the terminal group in the starting material $R^2$—O—$(R^3$—O$)_n$—H, the polyether sulfonate has, as the terminal —$R^5$—$SO_3H$ group, a —$CH_2CH_2$—$SO_3H$ or —$CH(CH_3)$—$CH_2$—$SO_3H$ or —$CH_2$—$CH(CH_3)$—$SO_3H$— group.

Polyether sulfonates $R^2$—O—$(R^3$—O$)_n$—$R^5$—$SO_3H$ can alternatively be obtained by adding vinylsulfonic acid onto $R^2$—O—$(R^3$—O$)_n$—H. Details on this subject are described, for example, in EP 311 961A1. Polyether sulfonates $R^2$—O—$(R^3$—O$)_n$—$R^5$—$SO_3H$ with a terminal —$CH_2$—$CH_2$—$CH_2$—$SO_3H$ group can be obtained by reacting $R^2$—O—$(R^3$—O$)_n$—H with 1,3-propanesultone. Polyether sulfonates $R^2$—O—$(R^3$—O$)_n$—$R^5$—$SO_3H$ with a terminal —$CH_2$—$CH(OH)$—$CH_2$—$SO_3H$ group are obtainable by the reaction of $R^2$—O—$(R^3$—O$)_n$—H with epichlorohydrin and subsequent nucleophilic substitution of the chloride group for sodium sulfite.

Polyether carboxylates $R^2$—O—$(R^3$—O$)_n$—$R^5$—COOH can be obtained by oxidizing $R^2$—O—$(R^3$—O$)_n$—$CH_2CH_2O$—H with suitable oxidizing agents. Suitable oxidizing agents for this purpose are all oxidizing agents, if appropriate in conjunction with suitable catalysts, which can oxidize the terminal OH group to the COOH group without oxidizing other parts of the molecule to a great degree. The oxidation can be undertaken, for example, with the aid of air or oxygen using a noble metal catalyst (for example a catalyst based on palladium). In this synthesis variant, a terminal —$CH_2$—COOH group is obtained.

In addition, $R^2$—O—$(R^3$—O$)_n$—H can be reacted with halocarboxylic acids, preferably ω-halocarboxylic acids of the general formula Hal-$R^4$—COOH. It is likewise possible to add on (meth)acrylic acid or a (meth)acrylic ester by means of a Michael addition. If the esters are used, they are hydrolyzed after the addition. In this synthesis variant—according to whether acrylic acid or (meth)acrylic acid has been used—terminal —$CH_2$—$CH_2$—COOH or —$CH_2$—$CH(CH_3)$—COOH groups are obtained.

Polyether phosphates $R^2$—O—$(R^3$—O$)_n$—$PO_3H_2$ can be obtained by esterifying $R^2$—O—$(R^3$—O$)_n$—H with phosphoric acid or reactive derivatives thereof.

Polyether phosphonates $R^2$—O—$(R^3$—O$)_n$—$R^5$—$PO_3H_2$ can be prepared, for example, by base-catalyzed addition of $R^2$—O—$(R^3$—O$)_n$—H onto vinylphosphonic acid or salts thereof. They can also be obtained by means of the Arbuzov reaction (see, for example, T. Laue and A. Plagens in "Namens- and Schlagwort-Reaktionen der organischen Chemie" [Named and key reactions in organic chemistry], Teubner, Stuttgart, 1998, p. 16ff). In this reaction, chlorides or preferably bromides of $R^2$—O—$(R^3$—O$)_n$—H, i.e. $R^2$—O—$(R^3$—O$)_n$—$R^3$—Cl or $R^2$—O—$(R^3$—O$)_n$—$R^3$—Br, are reacted with esters of phosphorous acid P(OR')$_3$ to obtain $R^2$—O—$(R^3$—O$)_n$—P(=O)(OR')$_2$, which can then be hydrolyzed to $R^2$—O—$(R^3$—O$)_n$—P(=O)(OH)$_2$. One variant is the reaction of the chlorides $R^2$—O—$(R^3$—O$)_n$—$R^3$—Cl with phosphine (PH$_3$) and subsequent oxidation to the phosphonic acid. This can be done, for example, by means of peroxides or $H_2O_2$.

Preferred cosurfactants (B) comprise nonionic surfactants $R^{2a}$—O—(—$CH_2$—$CH_2$—O$)_n$—H where n is from 6 to 9 and $R^{2a}$ is a $C_{10}$ radical or a radical having an average of from 9.5 to 10.5 carbon atoms, i.e. surfactants based on typical technical alcohol mixtures. They may more preferably be surfactants based on $C_{10}$ Guerbet alcohols.

Further preferred cosurfactants (B) comprise anionically modified surfactants $R^{2a}$—O—(—$CH_2$—$CH_2$—O$)_n$—$SO_3H$ where n is from 2 to 9 and $R^{2a}$ is a $C_{10}$ radical or a radical having an average of from 9.5 to 10.5 carbon atoms, i.e. surfactants based on typical technical alcohol mixtures. They may more preferably be surfactants based on $C_{10}$ Guerbet alcohols.

Further preferred cosurfactants (B) comprise anionically modified surfactants $R^{2a}$—O—(—$CH_2$—$CH_2$—O$)_n$—$R^5$—$SO_3H$ where n is from 2 to 9 and $R^{2a}$ is a $C_{10}$ radical or a radical having an average of from 9.5 to 10.5 carbon atoms, i.e. surfactants based on typical technical alcohol mixtures. They may more preferably be surfactants based on $C_{10}$ Guerbet alcohols.

Further preferred cosurfactants (B) comprise anionically modified surfactants $R^{2a}$—O—(—CH$_2$—CH$_2$—O)$_n$—R$^5$—CO$_2$H where n is from 2 to 9 and $R^{2a}$ is a $C_{10}$ radical or a radical having an average of from 9.5 to 10.5 carbon atoms, i.e. surfactants based on typical technical alcohol mixtures. They may more preferably be surfactants based on $C_{10}$ Guerbet alcohols.

Preferred cosurfactants (B) further comprise anionic surfactants of the general formula $R^{2b}$—O—(—CH$_2$—CH$_2$—O)$_n$—PO$_3$H$_2$ where n is from 4 to 6 and $R^{2b}$ is a phenyl radical.

Further preferred cosurfactants (B) further comprise anionic surfactants of the general formula $R^{2b}$—O—(—CH$_2$—CH$_2$—O)$_n$—SO$_3$H where n is from 4 to 6 and $R^{2b}$ is a phenyl radical.

Further preferred cosurfactants (B) further comprise anionic surfactants of the general formula $R^{2b}$—O—(—CH$_2$—CH$_2$—O)$_n$—R$^5$—SO$_3$H where n is from 4 to 6 and $R^{2b}$ is a phenyl radical.

Further Cosurfactants (C)

The surfactant mixture may additionally optionally comprise further cosurfactants (C) different than the surfactants (A) and the cosurfactants (B).

The cosurfactants (C) also have hydrophobic and hydrophilic molecular moieties. They may especially be polymeric cosurfactants. Polymeric cosurfactants advantageously allow the amount of surfactants needed to form a microemulsion to be reduced. Such polymeric cosurfactants are therefore also referred to as "microemulsion boosters".

Polymeric cosurfactants (C) may especially be amphiphilic block copolymers which comprise at least one hydrophilic block and at least one hydrophobic block. Such cosurfactants are described in WO 2006/131541. They preferably have molecular masses $M_n$ of from 1000 to 50 000 g/mol. The hydrophilic blocks and the hydrophobic blocks should generally have at least a molar mass of in each case 500 g/mol, preferably 750 g/mol and more preferably 1000 g/mol. The hydrophobic and hydrophilic blocks may be linked to one another in various ways. For example, they may be two-block copolymers or else multiblock copolymers in which the hydrophobic and hydrophilic blocks are arranged in alternation with one another. The polymers may be linear, branched or star-shaped, or may be a comb polymer which has a main chain and one or more side chains joined thereto.

Preference is given to block copolymers which have, as hydrophilic blocks, polyethylene oxide blocks or random polyethylene oxide-polypropylene oxide blocks, where the propylene oxide content should not exceed 40 mol %, preferably 20 mol % and more preferably 10 mol % based on the sum of ethylene oxide and propylene oxide units polymerized into the block. They are preferably pure polyethylene oxide blocks. The hydrophobic blocks may, for example, be blocks of polypropylene oxide or $C_4$- to $C_{12}$-alkylene oxides. In addition, hydrophobic blocks may be formed, for example, from hydrocarbon units or (meth)acrylic esters.

Preferred polymeric cosurfactants (C) comprise polypropylene oxide-polyethylene oxide block copolymers, polyisobutene-polyethylene oxide block copolymers and comb polymers with polyethylene oxide side chains and a hydrophobic main chain, the main chain comprising preferably essentially olefins or (meth)acrylates as structural units. The term "polyethylene oxide" here shall in each case include polyethylene oxide blocks comprising propylene oxide units as defined above. Further details of the preferred polymeric cosurfactants (C) are disclosed in WO 2006/131541.

Use of the Surfactant Mixture for Tertiary Mineral Oil Extraction

According to the invention, the surfactant mixture described, composed of the surfactants (A), the cosurfactants (B) and optionally cosurfactants (C), is used for tertiary mineral oil extraction. By significantly lowering the interfacial tension between oil and water, it brings about particularly good mobilization of the crude oil in the mineral oil formation.

According to the invention, the amount of the surfactants (A) in the mixture is from 1 to 99% by weight, especially from 50 to 99% by weight, preferably from 50 to 95% by weight, more preferably from 60 to 90% by weight and even more preferably from 70 to 85% by weight, based on the total amount of all surfactants (A), cosurfactants (B) and if appropriate cosurfactants (C).

According to the invention, the amount of the cosurfactants (B) in the mixture is from 1 to 90% by weight, especially from 1 to 50% by weight, preferably from 5 to 50% by weight, more preferably from 10 to 40% by weight and most preferably from 15 to 30% by weight, based on the total amount of all surfactants (A), cosurfactants (B) and if appropriate cosurfactants (C).

The weight ratio of the surfactants (A) to the cosurfactants (B) in the mixture is generally at least 1:9, preferably at least 1:1, more preferably at least 2:1 and most preferably at least 3:1.

The amount of the surfactants (A) and of the cosurfactants (B) together is, in accordance with the invention, at least 25% by weight based on the total amount of all surfactants (A), cosurfactants (B) and cosurfactants (C) used, especially at least 51% by weight, preferably at least 80% by weight, more preferably at least 90% by weight, and most preferably no cosurfactants (C) at all are present.

For tertiary mineral oil extraction, surfactant mixture in the form of a suitable formulation is injected into the mineral oil deposit through at least one injection bore, and crude oil is withdrawn from the deposit through at least one production bore. It will be appreciated that the term "crude oil" in this connection does not mean single-phase oil but rather the usual crude oil-water emulsions. In general, a deposit is provided with several injection bores and with several production bores. After the injection of the surfactant formulation, the so-called "surfactant flooding", the pressure can be maintained by injecting water into the formation ("water flooding"), or preferably a higher-viscosity, aqueous solution of a polymer with significant thickening action ("polymer flooding"). However, other techniques by which the surfactants are first allowed to act on the formation are also known. The person skilled in the art is aware of details of the industrial performance of the "surfactant flooding", "water flooding" and "polymer flooding", and employs an appropriate technique according to the type of deposit.

The surfactant mixture used in accordance with the invention is preferably used in aqueous formulation. As well as water, the formulations may optionally also comprise water-miscible or at least water-dispersible organic solvents. Such additives serve in particular to stabilize the surfactant solution during storage and/or transport to the oil field. The amount of such additional solvents should, though, generally not exceed 50% by weight, preferably 20% by weight and more preferably 10% by weight. In a particularly advantageous embodiment of the invention, exclusively water is used for formulation. Examples of water-miscible solvents comprise especially alcohols, such as methanol, ethanol or propanol.

The concentration of the surfactants in the formulation used is determined by the person skilled in the art according to the application. A total surfactant concentration of from 0.5 to 3.5% by weight has been found to be useful, without any intention that the invention be restricted thereto. The person skilled in the art makes a suitable selection according to the desired properties, more particularly according to the conditions in the mineral oil formation. It will be appreciated that it is possible first to produce a concentrate which is not diluted to the desired concentration until on site.

The mixture used in accordance with the invention can preferably be used for surfactant flooding of deposits whose formation water comprises more than 150 g/l of dissolved salts, more particularly for deposits whose formation water comprises more than 10 g/l, preferably more than 30 g/l, or alkaline earth metal ions.

It is suitable especially for microemulsion flooding of oil deposits (flooding in the Winsor III region or in the area of existence of the bicontinuous microemulsion phase). The technique of microemulsion flooding has already been outlined in detail at the outset.

The surfactant mixture may additionally be used in micellar flooding of oil deposits (flooding in the Winsor I region or in the oil-water range). While a brief pulse (0.1-0.3% of the pore volume of the deposit) of a solution which comprises sufficient surfactant (0.5-3.5% by weight) in order to ensure the formation of the microemulsion is injected in microemulsion flooding, a long pulse (up to 1.0% of the pore volume) at low surfactant concentration (<0.5, preferably 0.1%) is injected in micellar flooding.

The examples which follow are intended to illustrate the invention in detail:

Surfactants Used:

Surfactant (A)

The surfactant (A) used was an iso-$C_{16}$-olefin sulfonate which had been prepared by sulfonating a branched $C_{16}$-olefin. The $C_{16}$-olefin was prepared in a manner known in principle by oligomerizing a technical mixture of different butenes followed by the isolation of the $C_{16}$-olefin.

I) Olefin Oligomerization:

In an isothermal reactor of length about 1.5 m and of diameter 30 mm, raffinate II of the following composition was converted over a heterogeneous catalyst at 20 bar and 80° C.

| | |
|---|---|
| i-Butane: | 3% by weight |
| n-Butane: | 15% by weight |
| i-Butene: | 2% by weight |
| Butene-1: | 30% by weight |
| Butene-2-trans: | 32% by weight |
| Butene-2-cis: | 18% by weight |

The catalyst used was a material which had been prepared according to DE-A-43 39 713 in the form of tablets (5 mm×5 mm). The composition in % by weight of the active components was: 50% by weight of NiO, 12.5% by weight of $TiO_2$, 33.5% by weight of $SiO_2$, 4% by weight of $Al_2O_3$. The throughput was 0.75 kg of raffinate II/(l (cat)×h). There was no recycling of $C_4$ hydrocarbons. The $C_4$ conversion based on the butenes present in the raffinate II was 52.0% by weight.

The selectivity in % by weight was as follows: $C_8$: 76.9; $C_{12}$: 18.4 and $C_{16+}$: 4.7.

II) Distillation of the $C_{16+}$ Mixture:

The crude $C_{16+}$ mixture was distilled in an industrial distillation plant consisting of two columns with packing height in each case approx. 15 m (250 m²/m³). In the first column (forerun column), low boilers still present (in particular $C_{12}$ olefins) were removed overhead. In the second column (main run column), the $C_{16}$ olefin was removed overhead with a purity of >99%, while the $C_{20+}$ olefins were removed in the bottoms.

The two columns were operated with the following parameters:

| | Forerun column | Main run column |
|---|---|---|
| Top temperature | 135° C. | 165° C. |
| Bottom temperature | 180-182° C. | 225-230° C. |
| Pressure (top) | 85 mbar | 60 mbar |
| Pressure drop over packing | approx. 5 mbar | approx. 50 mbar |
| Feed | 2700 kg/h | 2500 kg/h |
| Top draw | 200 kg/h | 1700 kg/h |
| Reflux | 850 kg/h | 3000 kg/h |
| Bottoms | 2500 kg/h | 800 kg/h |

III) Sulfonation of the Resulting $iC_{16}$ Olefin

The olefin is sulfonated with $SO_3$ in a thin-film reactor with subsequent neutralization as a continuous process. The $SO_3$ required for this process is metered in by means of a Liqui-Flow (81 g/h) and evaporated in a glass evaporator at 100° C. In the downstream mixer, the $SO_3$ vapor is mixed with nitrogen (~1.24% $SO_3$ in the gas with gas introduction at 80° C.) and blown into the film reactor (2.2 m³/h). At the same time, the olefin is conveyed into this reactor by means of a Cori-Flow through an annular gap which generates the film. The feed rate for the $iC_{16}$ olefin is approx. 230 g/h; it flows at a temperature of 23° C. into the film reactor cooled to 15° C. The $iC_{16}$ olefin is used in an equimolar amount in relation to $SO_3$.

The reaction mixture is passed into a second reactor with the temperature of approx. 50° C. The gas stream is separated there from the liquid phase (sultone formed as an intermediate and olefin sulfonic acid), and the liquid phase runs into aqueous sodium hydroxide solution. The neutralization takes place at 40-60° C. This forms a mixture of neutralized olefin sulfonate and neutralized hydroxyalkylsulfonate. Based on the sultone and/or olefin sulfonic acid formed as an intermediate, 1.137 eq of NaOH are used, so as to result in a pH of 12. The product is drawn off as an aqueous solution; spent NaOH solution is replaced continuously in the neutralization reactor.

The compound was confirmed by 1H NMR, IR spectroscopy and size exclusion chromatography. The olefinsulfonate was obtained as an aqueous solution with a water content of 74.7%.

Cosurfactants (B) Used

C13-EO$_7$

Commercial nonionic surfactant of the general formula i-$C_{13}H_{27}$—O($CH_2$—$CH_2$—O)$_7$—H based on a $C_{13}$ oxo alcohol based on trimer butene, which is ethoxylated under alkaline catalysis. Mean degree of branching approx. 2.3. Mean degree of ethoxylation×approx. 7

C13-EO$_9$

Commercial nonionic surfactant of the general formula i-$C_{13}H_{27}$—O($CH_2$—$CH_2$—O)$_8$—H; alcohol as C13-EO$_7$, except mean degree of ethoxylation×approx. 9

C10-EO$_6$

Commercial nonionic surfactant of the general formula i-$C_{10}H_{21}$—O($CH_2$—$CH_2$—O)$_6$—H based on a $C_{10}$ oxo alcohol, which is ethoxylated under alkaline catalysis. Mean degree of branching approx. 2.2. Mean degree of ethoxylation×approx. 6

C10-EO$_7$

Commercial nonionic surfactant of the general formula i-C$_{10}$H$_{21}$—O(CH$_2$—CH$_2$—O)$_7$—H; alcohol as C10-EO$_6$, except mean degree of ethoxylation×approx. 7

C10(Gue)-EO$_6$

Commercial nonionic surfactant of the general formula i-C$_{10}$H$_{21}$—O(CH$_2$—CH$_2$—O)$_6$—H based on a C$_{10}$ Guerbet alcohol which is ethoxylated under alkaline catalysis. The C$_{10}$ Guerbet alcohol comprises about 85 mol % of 2-propylheptanol and approx. 15 mol % of more highly branched alcohols. Mean degree of branching approx. 1.15. Mean degree of ethoxylation×approx. 6

C10(Gue)-EO$_7$

Commercial nonionic surfactant of the general formula i-C$_{10}$H$_{21}$—O(CH$_2$—CH$_2$—O)$_7$—H; alcohol as C10(Gue)-EO$_6$, except mean degree of ethoxylation×approx. 7

C10(Gue)-EO$_8$

Commercial nonionic surfactant of the general formula i-C$_{10}$H$_{21}$—O(CH$_2$—CH$_2$—O)$_8$—H; alcohol as C10(Gue)-EO$_6$, except mean degree of ethoxylation×approx. 8 iC9-EO$_4$

Nonionic surfactant of the general formula i-C$_9$H$_{19}$—O(CH$_2$—CH$_2$—O)$_4$—H based on a C$_9$ oxo alcohol based on butene dimer, which is ethoxylated under alkaline catalysis. Mean degree of branching approx. 1.2. Mean degree of ethoxylation×=4 iC9-EO$_6$

Nonionic surfactant of the general formula i-C$_9$H$_{19}$—O(CH$_2$—CH$_2$—O)$_6$—H based on a C$_9$ oxo alcohol based on butene dimer, which is ethoxylated under alkaline catalysis. Mean degree of branching approx. 1.2. Mean degree of ethoxylation×=6 iC5-EO$_2$

Nonionic surfactant of the general formula i-C$_5$H$_{11}$—O(CH$_2$—CH$_2$—O)$_2$—H based on a C$_5$ oxo alcohol based on butene, which is ethoxylated under alkaline catalysis. Mean degree of branching approx. 0.35. Mean degree of ethoxylation×=2 iC5-EO$_3$

Nonionic surfactant of the general formula i-C$_5$H$_{11}$—O(CH$_2$—CH$_2$—O)$_3$—H based on a C$_5$ oxo alcohol based on butene, which is ethoxylated under alkaline catalysis. Mean degree of branching approx. 0.35. Mean degree of ethoxylation×=3 iC5-EO5

Nonionic surfactant of the general formula i-C$_5$H$_{11}$—O(CH$_2$—CH$_2$—O)$_5$—H based on a C$_5$ oxo alcohol based on butene, which is ethoxylated under alkaline catalysis. Mean degree of branching approx. 0.35. Mean degree of ethoxylation×=5 iC5-EO$_7$

Nonionic surfactant of the general formula i-C$_5$H$_{11}$—O(CH$_2$—CH$_2$—O)$_7$—H based on a C$_5$ oxo alcohol based on butene, which is ethoxylated under alkaline catalysis. Mean degree of branching approx. 0.35. Mean degree of ethoxylation×=7

Performance Tests—Formation of a Microemulsion

Formation Water

For the tests, high-salinity water (approx. 70 g/l of NaCl and approx. 10 g/l of CaCl$_2$) was used, whose composition corresponds to typical deposit water.

Oil Phase

The model oil used was dodecane.

Surfactant Mixture Used:

The surfactant mixture used in the tests consisted of 83.3% by weight of surfactant (A) (iso-C16-olefinsulfonate) and in each case 16.7% by weight of the cosurfactants (B) used for the particular tests.

General Test Description:

16.1 g of water, 1.4 g of NaCl and 0.2 g of anhydrous CaCl$_2$ were initially charged in a 50 ml glass measuring cylinder with an internal diameter of 2.2 cm and homogenized. Thereafter, 1 g of surfactant (A) (3.95 g of iso-C16-olefinsulfonate; 25.3% by weight in water) and 0.2 g of the particular cosurfactant (B) used and also 19.5 ml of dodecane were added. This corresponds to approx. 19.5 ml of water phase, approx. 19.5 ml of oil and approx. 1 ml of surfactant, 40 ml in total. The weight ratio of surfactant (A) to cosurfactant (B) is 5:1.

Subsequently, the blend was equilibrated at 23° C. with stirring, then left to stand at 23° C. until three clear phases had formed, and the volumes of the particular phases were finally read off. What are of significance in this context are especially the volume of the microemulsion phase—the middle phase—and the difference between the oil phase at the top and the water phase at the bottom.

After the separation, the phases were mixed by twice manually upturning the measuring cylinder and the time until the phases had clearly separated again was recorded. In addition, the interfacial tension can be calculated from the tests. The interfacial tension between water and oil was determined in a known manner via the measurement of the solubilization parameter SP*. The determination of the interfacial tension via the determination of the solubilization parameter SP* is a method accepted in the technical field for approximate determination of the interfacial tension. The solubilization parameter SP$^o$ indicates how many ml of oil are dissolved per ml of surfactant used in a microemulsion (Windsor type III); SP$^w$ indicates analogously how many ml of water phase are dissolved per ml of surfactant used. When equal amounts of water and oil phase are dissolved in a microemulsion, the system is considered to be ideally balanced. SP$^o$ is referred to here equally as SP$^w$ and SP*; the interfacial tension between oil and water phase will be minimal. This interfacial tension σ (IFT) can be calculated therefrom via the approximate formula IFT≈0.3/(SP*)$^2$ (C. Huh, J. Coll. Interf. Sc., Vol. 71, No. 2 (1979)).

The separation times depend on the balance of the system and are viably comparable when SP$^o$=SP$^w$=SP* (see D. O, Shah in "Surface Phenomena in Enhanced Oil Recovery", Plenum Press, 1981).

The results of the examples and comparative examples are compiled in Tables 1 to 5.

COMPARATIVE EXAMPLE 1

The cosurfactant (B) used was mixtures of C13-EO$_7$ and C13-EO3, which have an excessively large number of carbon atoms.

In the balanced state, SP*=SP$^o$=SP$^w$=approx. 5 is obtained, corresponding to an interfacial tension between water and oil of approx. 0.3/25 mN/m=approx. 0.012 mN/m, and a separation time of 7.5 minutes. The results are compiled in Table 1.

COMPARATIVE EXAMPLE 2

Instead of cosurfactant (B), the cosolvent isobutanol was used. In combination with the surfactant (A), however, no microemulsion formed, but rather a flocculent precipitate. Isobutanol is apparently unsuitable as a cosurfactant (B).

COMPARATIVE EXAMPLE 3

The cosurfactant (B) used was mixtures of iC$_5$-EO$_2$, iC$_5$-EO$_3$, iC$_5$-EO$_5$ and iC5-EO$_7$, which have too low a number of carbon atoms.

A balanced state could not be found. At the same time, precipitation of the surfactant was observed. The results are compiled in table 2.

EXAMPLE 1

The cosurfactant (B) used was C10-EO$_6$ or C10-EO$_7$ or mixtures thereof.

In the balanced state, $SP^*=SP^o=SP^w=4$ is obtained, corresponding to an interfacial tension between water and oil of 0.3/16 mN/m=0.019 mN/m, and a separation time of 2.5 minutes. The results are compiled in Table 3.

EXAMPLE 2

The cosurfactant (B) used was C10(Gue)-$EO_6$, C10(Gue)-$EO_7$ or C10(Gue)-$EO_8$.

In the balanced state, $SP^*=SP^o=SP^w=5$ is obtained, corresponding to an interfacial tension between water and oil of 0.3/25 mN/m=0.012 mN/m, and a separation time of 2.0 minutes. The results are compiled in Table 4.

EXAMPLE 3

The cosurfactant (B) used was mixtures of iC9-$EO_4$ and iC9-$EO_6$.

In the balanced state, $SP^*=SP^o=SP^w=$approx. 2.3 is obtained, corresponding to an interfacial tension between water and oil of approx. (0.3)/(5.5) mN/m=approx. 0.055 mN/m, and a separation time of 4 minutes. The results are compiled in table 5.

The examples and comparative examples show that C10-$EO_6$ and C10-$EO_7$ with oil and water phase of equal size, i.e. in an ideally balanced surfactant system, three times more rapid phase separation than C13-$EO_7$+C13-$EO_9$.

The surfactants based on the Guerbet alcohol ensure almost four times more rapid phase separation than C13-$EO_7$+C13-$EO_9$ and phase separation more rapid by 25% than in the case of C10-$EO_6$ and C10-$EO_7$. In addition, the microemulsion phase when the surfactants based on the Guerbet alcohol are used is larger than in the case of C10-$EO_6$ and C10-$EO_7$. According to the formula of Huh, a lower interfacial tension thus arises for the former surfactant system.

In the case of cosurfactants having fewer than 6 carbon atoms, no balanced state could be found. At the same time, precipitation of the surfactant was observed.

TABLE 1

Test results with noninventive cosurfactants (B)

| Cosurfactant used (weight ratio in brackets) | Volume of the microemulsion [ml] | Interfacial tension [mN/m] | Volume of oil phase minus volume of water phase [ml] | Separation time [min] |
|---|---|---|---|---|
| C13-$EO_7$ + C13-$EO_9$ (75/25) | 11.5 | — | 1.5 | 16 |
| C13-$EO_7$ + C13-$EO_9$ (50/50) | 11 | 0.012 | 0 | 7.5 |
| C13-$EO_7$ + C13-$EO_9$ (40/60) | 13 | — | −2 | 30 |

TABLE 2

Test results with noninventive cosurfactants (B)

| Cosurfactant used (weight ratio in brackets) | Volume of the microemulsion [ml] | Interfacial tension [mN/m] | Volume of oil phase minus volume of water phase [ml] | Separation time [min] |
|---|---|---|---|---|
| iC5-OH | no middle phase precipitate | — | | |
| iC5-$EO_2$ + iC5-$EO_3$(75/25) | 5.5 ml + precipitate | | −0.5 | 14 min |
| iC5-$EO_3$ | no middle phase + precipitate | — | | |
| iC5-$EO_5$ | no middle phase | — | | |
| iC5-$EO_7$ | no middle phase | — | | |

TABLE 3

Test results with inventive cosurfactants (B)

| Cosurfactant used (weight ratio in brackets) | Volume of the microemulsion [ml] | Interfacial tension [mN/m] | Volume of oil phase minus volume of water phase [ml] | Separation time [min] |
|---|---|---|---|---|
| C10-$EO_6$ | 9.5 | — | 1.5 | 11 |
| C10-$EO_6$/C10-$EO_7$ (75/25) | 9 | 0.019 | 0 | 2.5 |
| C10-$EO_6$/C10-$EO_7$ (50/50) | 10 | — | −1 | 3 |
| C10-$EO_6$ | 10.5 | — | −1.5 | 10 |

TABLE 4

Test results with inventive cosurfactants (B) based on Guerbet alcohols.

| Cosurfactant used (weight ratio in brackets) | Volume of the microemulsion [ml] | Interfacial tension [mN/m] | Volume of oil phase minus volume of water phase [ml] | Separation time [min] |
|---|---|---|---|---|
| C10(Gue)-EO$_6$ | 11 | — | 2.3 | 14 |
| C10(Gue)-EO$_7$ | 11 | 0.012 | 0 | 2 |
| C10(Gue)-EO$_8$ | 10.5 | — | −0.5 | 3 |

TABLE 5

Test results with inventive cosurfactants (B).

| Cosurfactant used (weight ratio in brackets) | Volume of the microemulsion [ml] | Interfacial tension [nnN/nn] | Volume of oil phase minus volume of water phase [ml] | Separation time [min] |
|---|---|---|---|---|
| iC9-EO$_4$ | 6 | — | 1 | 7 |
| iC9-EO$_4$ + iC9-EO$_6$(65/35) | 7 | 0.055 | 0 | 4 |

The invention claimed is:

1. A method of tertiary mineral oil extraction, which is a method for surfactant flooding, comprising injecting a surfactant formulation through at least one injection bore into a mineral oil deposit, thereby lowering an interfacial tension between water and mineral oil, and removing crude oil from the deposit through at least one production bore, said surfactant mixture comprising at least the following surfactants:
from 50 to 99% by weight of at least one surfactant (A) of the general formula $R^1$—X where $R^1$ is a hydrocarbon radical having from 12 to 30 carbon atoms and X is an anionic or nonionic hydrophilic group, and
from 1 to 50% by weight of at least one cosurfactant (B), where the amounts stated are based in each case on the total amount of all surfactants in the mixture, wherein the cosurfactant (B) has the general formula $R^2$—O—$(R^3$—O$)_n$—$R^4$ (I) and where the $R^2$, $R^3$ and $R^4$ radicals and the number n are each defined as follows:
n is from 2 to 20,
$R^2$ is a branched hydrocarbon radical which has from 6 to 11 carbon atoms and an average degree of branching of from 1 to 2.5, selected from the group of
$R^{2a}$ saturated, aliphatic hydrocarbon radicals, or
$R^{2b}$ phenyl or $R^6$-phenyl, where $R^6$ is an alkyl radical having from 1 to 5 carbon atoms
$R^{2c}$ phenyl-substituted hydrocarbon radicals of the general formula phenyl-$R^7$ where $R^7$ is a divalent hydrocarbon radical having from 1 to 5 carbon atoms,
$R^3$ are each independently an ethylene group or a propylene group, with the proviso that the ethylene and propylene groups—where both types of groups are present—may be arranged randomly, alternately or in block structure,
$R^4$ is hydrogen or a group selected from the group of —SO$_3$H, —PO$_3$H$_2$, —$R^5$—COOH, —$R^5$—SO$_3$H or —$R^5$—PO$_3$H$_2$ or salts thereof, where $R^5$ is a divalent hydrocarbon group having from 1 to 4 carbon atoms, with the proviso that the amount of surfactants (A) and cosurfactants (B) together is at least 25% by weight based on the amount of all surfactants in the mixture, wherein the surfactant mixture is used in the presence of formation water which comprises more than 150 g/l of dissolved salts.

2. The method according to claim 1, wherein X is a sulfonic acid group —SO$_3$H or a salt thereof.

3. The method according to claim 1, wherein n is from 6 to 15.

4. The method according to claim 1, wherein at most 2 of the $R^3$ radicals are propylene groups.

5. The method according to claim 1, wherein all $R^3$ radicals are ethylene groups.

6. The method according to claim 1, which comprises an $R^{2a}$ radical having a mean degree of branching of from 1 to 1.5.

7. The method according to claim 1, which comprises an $R^{2a}$ radical having an average of from 8 to 10 carbon atoms.

8. The method according to claim 1, which comprises an $R^{2a}$ radical having an average of from 9.5 to 10.5 carbon atoms.

9. The method according to claim 1, which comprises an $R^{2a}$ radical which derives from a Guerbet alcohol and in which at least 65 mol % have the general formula (II)

where p is 0, 1 or 2.

10. The method according to claim 1, which comprises an $R^{2b}$ radical selected from the group of phenyl, 2-methyl-1-phenyl, 3-methyl-1-phenyl, 4-methyl-1-phenyl, 2-ethyl-1-phenyl, 3-ethyl-1-phenyl or 4-ethyl-1-phenyl.

11. The method according to claim 1, wherein $R^4$ is —$R^5$—SO$_3$H or a salt thereof.

12. The method according to claim 1, wherein $R^4$ is hydrogen.

13. The method according to claim 1, wherein $R^4$ is —PO$_3$H$_2$ or a salt thereof.

14. The method according to claim 1, wherein the amount of surfactants (A) and cosurfactants (B) together is at least 50% by weight based on the amount of all surfactants in the mixture.

15. The method according to claim 1, wherein the mixture comprises from 60 to 90% by weight of surfactants (A) and from 10 to 40% by weight of cosurfactants (B).

16. The method according to claim 1, wherein the weight ratio of surfactants (A) to cosurfactants (B) is at least 2:1.

17. The method according to claim 1, wherein the surfactants, the water, and the mineral oil form a microemulsion.

18. A method of tertiary mineral oil extraction, which is a method for surfactant flooding, comprising injecting a surfactant formulation through at least one injection bore into a mineral oil deposit, thereby lowering an interfacial tension between water and mineral oil, and removing crude oil from the deposit through at least one production bore, said surfactant mixture comprising at least the following surfactants:

from 50 to 99% by weight of at least one surfactant (A) of the general formula $R^1$—X where $R^1$ is a hydrocarbon radical having from 12 to 30 carbon atoms and X is an anionic or nonionic hydrophilic group, and from 1 to 50% by weight of at least one cosurfactant (B), where the amounts stated are based in each case on the total amount of all surfactants in the mixture, wherein the cosurfactant (B) has the general formula $R^2$—O—$(R^3$—O$)_n$—$R^4$ (I) and where the $R^2$, $R^3$ and $R^4$ radicals and the number n are each defined as follows:

n is from 2 to 20, $R^2$ is a branched hydrocarbon radical which has from 6 to 11 carbon atoms and an average degree of branching of from 1 to 2.5, selected from the group of $R^{2a}$ saturated, aliphatic hydrocarbon radicals, or $R^{2b}$ phenyl or $R^6$-phenyl, where $R^6$ is an alkyl radical having from 1 to 5 carbon atoms $R^{2c}$ phenyl-substituted hydrocarbon radicals of the general formula phenyl-$R^7$ where $R^7$ is a divalent hydrocarbon radical having from 1 to 5 carbon atoms, $R^3$ are each independently an ethylene group or a propylene group, with the proviso that the ethylene and propylene groups—where both types of groups are present—may be arranged randomly, alternately or in block structure, $R^4$ is hydrogen or a group selected from the group of —SO$_3$H, —PO$_3$H$_2$, —$R^5$—COOH, —$R^5$—SO$_3$H or —$R^5$—PO$_3$H$_2$ or salts thereof, where $R^5$ is a divalent hydrocarbon group having from 1 to 4 carbon atoms, with the proviso that the amount of surfactants (A) and cosurfactants (B) together is at least 25% by weight based on the amount of all surfactants in the mixture, wherein the surfactant mixture is used in the presence of formation water which comprises more than 10 g/l of alkaline earth metal ions.

19. A method of tertiary mineral oil extraction, which is a method for surfactant flooding, comprising injecting a surfactant formulation through at least one injection bore into a mineral oil deposit, thereby lowering an interfacial tension between water and mineral oil, and removing crude oil from the deposit through at least one production bore, said surfactant mixture comprising at least the following surfactants:

from 50 to 99% by weight of at least one surfactant (A) of the general formula $R^1$—X where $R^1$ is a hydrocarbon radical having from 12 to 30 carbon atoms and X is an anionic or nonionic hydrophilic group, and from 1 to 50% by weight of at least one cosurfactant (B), where the amounts stated are based in each case on the total amount of all surfactants in the mixture, wherein the cosurfactant (B) has the general formula $R^2$—O—$(R^3$—O$)_n$—$R^4$ (I) and where the $R^2$, $R^3$ and $R^4$ radicals and the number n are each defined as follows:

n is from 2 to 20, $R^2$ is a branched hydrocarbon radical which has from 6 to 11 carbon atoms and an average degree of branching of from 1 to 2.5, selected from the group of $R^{2a}$ saturated, aliphatic hydrocarbon radicals, or $R^{2b}$ phenyl or $R^6$-phenyl, where $R^6$ is an alkyl radical having from 1 to 5 carbon atoms $R^{2c}$ phenyl-substituted hydrocarbon radicals of the general formula phenyl-$R^7$ where $R^7$ is a divalent hydrocarbon radical having from 1 to 5 carbon atoms, $R^3$ are each independently an ethylene group or a propylene group, with the proviso that the ethylene and propylene groups—where both types of groups are present—may be arranged randomly, alternately or in block structure, $R^4$ is hydrogen or a group selected from the group of —SO$_3$H—PO$_3$H$_2$, —$R^5$—COOH, —$R^5$—SO$_3$H or —$R^5$—PO$_3$H$_2$ or salts thereof, where $R^5$ is a divalent hydrocarbon group having from 1 to 4 carbon atoms, with the proviso that the amount of surfactants (A) and cosurfactants (B) together is at least 25% by weight based on the amount of all surfactants in the mixture, wherein the surfactant mixture is used in the presence of formation water which comprises more than 30 g/l of alkaline earth metal ions.

* * * * *